(12) United States Patent
Miyatake et al.

(10) Patent No.: US 10,471,420 B2
(45) Date of Patent: Nov. 12, 2019

(54) CATION EXCHANGE RESIN, AND CATION EXCHANGE MEMBRANE AND FUEL CELL ELECTROLYTE MEMBRANE USING SAME

(71) Applicants: University of Yamanashi, Kofu-shi, Yamanashi (JP); Takahata Precision Co., Ltd., Fuefuki-shi, Yamanashi (JP)

(72) Inventors: Kenji Miyatake, Kofu (JP); Makoto Uchida, Kofu (JP); Jyunpei Miyake, Kofu (JP); Takashi Mochizuki, Kofu (JP); Hideaki Ono, Kofu (JP); Manai Shimada, Fuefuki (JP); Naoki Yokota, Fuefuki (JP); Natsumi Yoshimura, Fuefuki (JP)

(73) Assignees: UNIVERSITY OF YAMANASHI, Kofu-shi (JP); TAKAHATA PRECISION CO., LTD., Fuefuki-shi (JP)

( * ) Notice: Subject to any disclaimer, the term of this patent is extended or adjusted under 35 U.S.C. 154(b) by 9 days.

(21) Appl. No.: 15/738,270

(22) PCT Filed: Jun. 29, 2016

(86) PCT No.: PCT/JP2016/069364
§ 371 (c)(1),
(2) Date: Dec. 20, 2017

(87) PCT Pub. No.: WO2017/006831
PCT Pub. Date: Jan. 12, 2017

(65) Prior Publication Data
US 2018/0178210 A1 Jun. 28, 2018

(30) Foreign Application Priority Data
Jul. 3, 2015 (JP) .................. 2015-134000

(51) Int. Cl.
| | | |
|---|---|---|
| *B01J 39/19* | (2017.01) | |
| *C08G 61/10* | (2006.01) | |
| *C08J 5/22* | (2006.01) | |
| *H01M 8/10* | (2016.01) | |
| *C08G 61/02* | (2006.01) | |
| *B01J 47/12* | (2017.01) | |
| *H01M 8/1023* | (2016.01) | |
| *H01M 8/1039* | (2016.01) | |
| *H01M 8/1018* | (2016.01) | |
| *H01M 8/1037* | (2016.01) | |

(52) U.S. Cl.
CPC .............. *B01J 39/19* (2017.01); *B01J 47/12* (2013.01); *C08G 61/02* (2013.01); *C08G 61/10* (2013.01); *C08J 5/2218* (2013.01); *C08J 5/2262* (2013.01); *H01M 8/1023* (2013.01); *H01M 8/1039* (2013.01); *C08G 2261/122* (2013.01); *C08G 2261/146* (2013.01); *C08G 2261/1452* (2013.01); *C08G 2261/19* (2013.01); *C08G 2261/312* (2013.01); *C08G 2261/3424* (2013.01); *C08G 2261/412* (2013.01); *C08G 2261/516* (2013.01); *C08J 2365/00* (2013.01); *H01M 8/1037* (2013.01); *H01M 2008/1095* (2013.01)

(58) Field of Classification Search
CPC . B01J 39/19; C08J 5/22; C08J 5/2262; C08G 61/10; C08G 61/02; C08G 2261/122; C08G 2261/1452; C08G 2261/146; C08G 2261/19; C08G 2261/312; C08G 2261/3424; C08G 2261/412; C08G 2261/516; H01M 8/10; H01M 8/02; H01M 2008/1095
USPC ........................................................... 521/27
See application file for complete search history.

(56) References Cited

U.S. PATENT DOCUMENTS

| | | | |
|---|---|---|---|
| 3,969,285 A | 7/1976 | Grot | |
| 4,026,785 A | 5/1977 | Grot | |

(Continued)

FOREIGN PATENT DOCUMENTS

| | | |
|---|---|---|
| JP | 2006-045512 A | 2/2006 |
| JP | 2008-038146 A | 2/2008 |

(Continued)

OTHER PUBLICATIONS

WIPO, Japanese International Search Authority, International Search Report and Written Opinion dated Aug. 23, 2016 in International Patent Application No. PCT/JP2016/069364, 9 pages.

(Continued)

*Primary Examiner* — Michael Bernshteyn
(74) *Attorney, Agent, or Firm* — Masuvalley & Partners

(57) ABSTRACT

The present invention provides a cation exchange resin, and a cation exchange membrane and an electrolyte membrane for a fuel cell using the same. The cation exchange resin comprises a divalent hydrophobic unit; and a divalent hydrophilic unit having divalent hydrophilic groups which are repeated via carbon-carbon bond. The divalent hydrophilic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, and at least one of the aromatic rings having a cation exchange group; wherein the hydrophobic unit and the hydrophilic unit are bonded to each other via carbon-carbon bond.

8 Claims, 1 Drawing Sheet

(56) References Cited

U.S. PATENT DOCUMENTS

| | | | |
|---|---|---|---|
| 4,029,783 A | 6/1977 | Wiedemann et al. | |
| 4,030,988 A | 6/1977 | Grot | |
| 7,973,088 B2 * | 7/2011 | Ikeuchi | C08J 5/2256 204/192.33 |
| 2009/0117438 A1 * | 5/2009 | Saito | C08J 5/2256 429/493 |
| 2012/0238648 A1 * | 9/2012 | Zhou | B01J 49/00 521/27 |
| 2013/0108944 A1 | 5/2013 | Yang et al. | |

FOREIGN PATENT DOCUMENTS

| | | |
|---|---|---|
| JP | 2013-047309 A | 3/2013 |
| JP | 2013-209457 A | 10/2013 |
| JP | 2013-538797 A | 10/2013 |

OTHER PUBLICATIONS

Ghassemzadeh, L. et al., "Selective formation of Hydrogen and Hydroxul Radicals by Electron Beam Irradiation and Their Reactivity with Perfluorosulfonated Acid Ionomer," *J. Am. Chem. Soc.* 2013, 135, 15923-15932, 10 pages.

Ghassemzadeh, L. et al., "Quantifying the Structural Changes of Perfluorosulfonated Acid Ionomer Upon Reaction with Hydroxyl Radicals," *J. Am. Chem. Soc.* 2013-135, 8181-8184, 4 pages.

Mauritz, K.A. et al., "State of Understanding of Nafion," *Chem. Rev.* 2004, 104, 4535-4585, 52 pages.

JPO, Office Action dated Mar. 7, 2017 in JP Patent Application No. 2015-134000, total 4 pages with English translation.

* cited by examiner

CATION EXCHANGE RESIN, AND CATION EXCHANGE MEMBRANE AND FUEL CELL ELECTROLYTE MEMBRANE USING SAME

RELATED APPLICATIONS

This application is the U.S. National Phase of and claims priority to International Patent Application No. PCT/JP2016/069364, International Filing Date Jun. 29, 2016, entitled Cation Exchange Resin, And Cation Exchange Membrane and Fuel Cell Electrolyte Membrane Using Same; which claims benefit of Japanese Application No. 2015-134000 filed Jul. 3, 2015; both of which are incorporated herein by reference in their entireties.

FIELD OF THE INVENTION

The present invention relates to a cation exchange resin, and a cation exchange membrane and an electrolyte membrane for a fuel cell using the same.

BACKGROUND ART

Nafion®, a cation exchange resin, has been used as a standard electrolyte membrane for a fuel cell because of its high electrical conductivity (Patent Documents 1 to 3 and Non-Patent Documents 1 to 3).

PRIOR ART DOCUMENTS

Patent Documents

Patent Document 1: U.S. Pat. No. 3,969,285
Patent Document 2: U.S. Pat. No. 4,026,783
Patent Document 3: U.S. Pat. No. 4,030,988

Non-Patent Documents

Non-Patent Document 1: Chem. Rev. 2004, 104, 4535-4586.
Non-Patent Document 2: J. Am. Chem. Soc. 2013, 135, 8181-8184.
Non-Patent Document 3: J. Am. Chem. Soc. 2013, 135, 15923-15932.

SUMMARY OF THE INVENTION

Problems to be Solved by the Invention

However, the cation exchange resin as described in Patent Document 1 has a problem of insufficient chemical stability (durability, in particular, radical resistance). The cation exchange resin also has a problem of insufficient resistance effect to gas penetration.

Accordingly, an object of the present invention is to provide a cation exchange resin having improved chemical properties (durability, solubility, and resistance effect to gas penetration) and improved mechanical properties (flexibility), and a cation exchange membrane and an electrolyte membrane for a fuel cell using the same.

Means for Solving the Problems

In order to solve the problems, the cation exchange resin of the present invention, comprising:
a divalent hydrophobic unit shown in the following formula (1); and
a divalent hydrophilic unit having divalent hydrophilic groups which are repeated via carbon-carbon bond, the divalent hydrophilic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, at least one of the aromatic rings having a cation exchange group;
wherein the hydrophobic unit and the hydrophilic unit are bonded to each other via carbon-carbon bond.

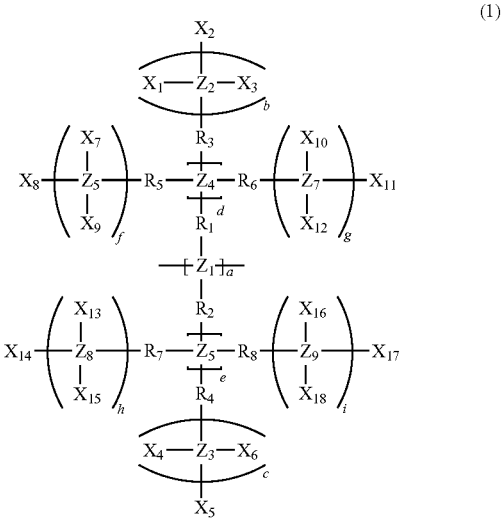

(1)

(In the formula, $Z_1$ to $Z_9$ are the same or different and represent carbon atom or silicon atom; $R_1$ to $R_8$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; and b, c, d, e, f, g, h and i are the same or different and represent an integer of 0 or more.)

In the cation exchange resin of the present invention, it is suitable that the hydrophilic group is a bisphenol residue which is substituted with a substituent group having a cation exchange group, as shown in the following formula (2), or an o-, m- or p-phenylene group which is substituted with a substituent group having a cation exchange group, as shown in the following formula (2').

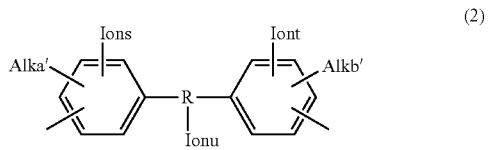

(2)

(In the formula, R represents a hydrocarbon group, a silicon-containing group, a nitrogen-containing group, a phosphorus-containing group, an oxygen-containing group, a sulfur-containing group, an aromatic group, or direct bond, which is not substituted or which is substituted with a substituent group having a cation exchange group; each Alk is the same or different and represents an alkyl group; each Ion is the same or different and represents a substituent group having a cation exchange group; a' and b' are the same or different and represent an integer of 0 to 4; and s, t and u are the same or different and represent an integer of 0 to 4 and at least one of s, t and u is 1 or more.)

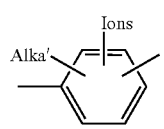
(2')

(In the formula, Alk represents an alkyl group; Ion represents a substituent group having a cation exchange group; a' represents an integer of 0 to 4; and s represents an integer of 1 to 4.)

In the cation exchange resin of the present invention, it is suitable that the hydrophobic unit is a divalent fluorinated saturated hydrocarbon group or a divalent saturated hydrocarbon group.

In order to solve the problems, the cation exchange membrane of the present invention comprises the cation exchange resin as described above.

In order to solve the problems, the electrolyte membrane for a fuel cell of the present invention comprises the cation exchange resin as described above.

Effect of the Invention

The present invention can provide a cation exchange resin having improved chemical properties and mechanical properties, and a cation exchange membrane and an electrolyte membrane for a fuel cell using the same.

MODE FOR CARRYING OUT THE INVENTION

Figure 1:
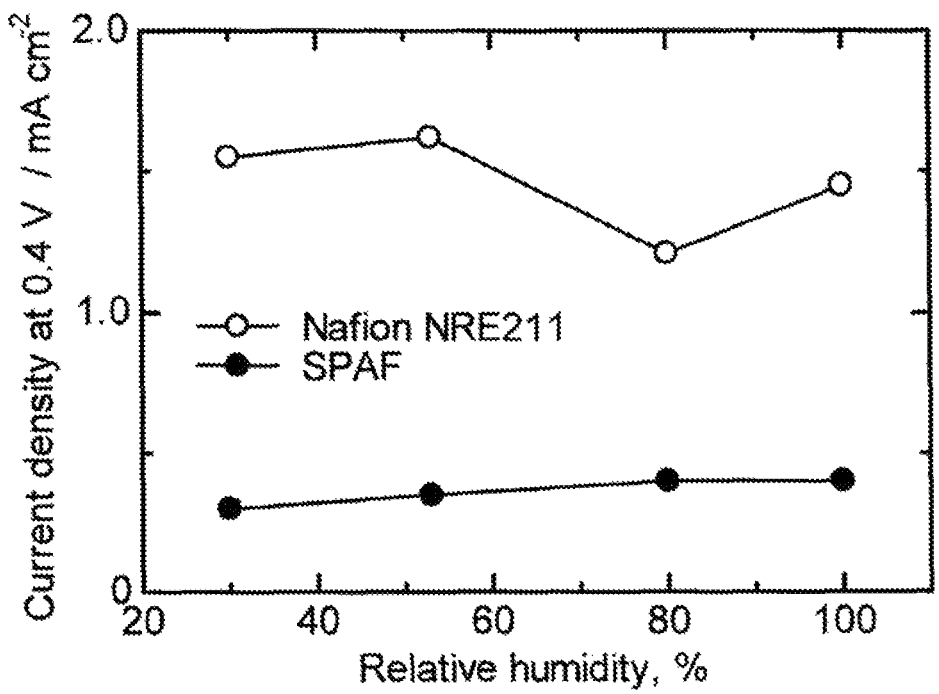
FIG. 1 is a graph showing the results of Linear Sweep Voltammetry using SPAF membrane or Nafion® NRE211 membrane as a cell.

The cation exchange resin of the present invention is composed of a divalent hydrophobic unit and a divalent hydrophilic unit.

In the cation exchange resin of the present invention, the divalent hydrophobic unit is shown in the following formula (1).

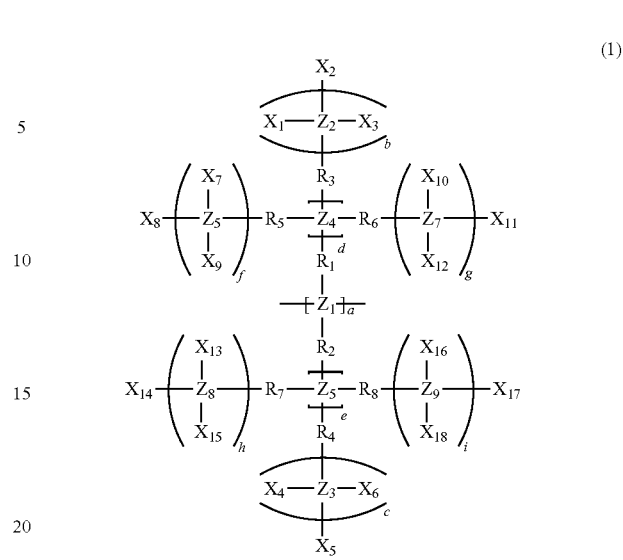

(In the formula, $Z_1$ to $Z_9$ are the same or different and represent carbon atom or silicon atom; $R_1$ to $R_8$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; and b, c, d, e, f, g, h and i are the same or different and represent an integer of 0 or more.)

In the above formula (1), $Z_1$ to $Z_9$ are the same or different and represent carbon atom or silicon atom, and are preferably carbon atom.

In the above formula (1), $R_1$ to $R_8$ are the same or different and represent a silicon-containing group, a nitrogen-containing group, a phosphorus-containing group, an oxygen-containing group, a sulfur-containing group, or direct bond, and are preferably direct bond.

In the above formula (1), $X_1$ to $X_{18}$ are the same or different and represent a halogen atom or a pseudohalide, or hydrogen atom, as described above, and are preferably a halogen atom or hydrogen atom. Examples of the halogen atom include fluorine, chlorine, bromine, and iodine. Examples of the pseudohalide include a trifluoromethyl group, —CN, —NC, —OCN, —NCO, —ONC, —SCN, —NCS, —SeCN, —NCSe, —TeCN, —NCTe, and —$N_3$.

In the above formula (1), a represents an integer of 1 or more, preferably represents an integer of 1 to 20, and more preferably represents an integer of 4 to 8.

In the above formula (1), b, c, d, e, f, g, h and i are the same or different and represent an integer of 0 or more, preferably represent an integer of 0 to 10, more preferably represent an integer of 0 to 3, and further preferably represent an integer of 0 or 1.

In the cation exchange resin of the present invention, the divalent hydrophobic unit may be bonded to a divalent hydrocarbon group via carbon-carbon bond or carbon-silicon bond, as shown in the following formula (1'). In this case, the hydrophobic unit is regarded as containing the divalent hydrocarbon group.

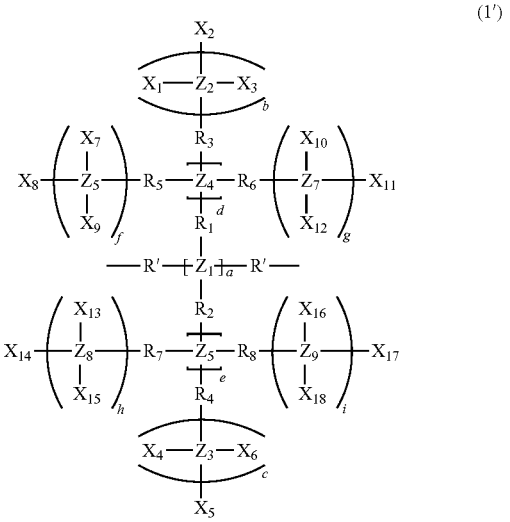

(1')

(In the formula, $Z_1$ to $Z_9$, $R_1$ to $R_8$, $X_1$ to $X_{18}$, a, b, c, d, e, f, g, h and i have the same meaning as $Z_1$ to $Z_9$, $R_1$ to $R_8$, $X_1$ to $X_{18}$, a, b, c, d, e, f, g, h and i in the above formula (1); and each R' is the same or different and represents a divalent hydrocarbon group or direct bond.)

Examples of the divalent hydrocarbon group include, for example, divalent aliphatic hydrocarbon groups having carbon atoms of 1 to 20 such as methylene (—$CH_2$—), ethylene, propylene, isopropylene (—$C(CH_3)_2$—), butylene, isobutylene, sec-butylene, pentylene (pentene), isopentylene, sec-pentylene, hexylene (hexamethylene), 3-methylpentene, heptylene, octylene, 2-ethylhexylene, nonylene, decylene, isodecylene, dodecylene, tetradecylene, hexadecylene, and octadecylene (hereinbefore referred to as divalent saturated hydrocarbon groups), and cyclopropane, cyclobutane, cyclopentane, cyclohexane, cycloheptane, and cyclooctane (hereinbefore referred to as divalent alicyclic hydrocarbon groups); and divalent aromatic hydrocarbon groups having carbon atoms of 6 to 20 such as o-, m- or p-phenylene group.

Preferred examples of the divalent hydrocarbon group include divalent saturated hydrocarbon groups having carbon atoms of 1 to 3, and more specifically include methylene (—$CH_2$—), ethylene, propylene, isopropylene (—$C(CH_3)_2$—). More preferred examples of the divalent hydrocarbon group include methylene (—$CH_2$—) and isopropylene (—$C(CH_3)_2$—), and particularly preferred examples of the divalent hydrocarbon group include isopropylene (—$C(CH_3)_2$—). Preferred examples of the divalent hydrocarbon group also include o-, m- or p-phenylene group.

If needed, the divalent hydrocarbon group may be substituted with a substituent group such as a halogen atom, an alkyl group, or a pseudohalide. In the case where the divalent hydrocarbon group is substituted with a substituent group such as a halogen atom, an alkyl group, or a pseudohalide, the number and the position of the substituent group such as a halogen atom, an alkyl group, or a pseudohalide are suitably selected depending on the purpose and application.

Examples of the alkyl group include alkyl groups having carbon atoms of 1 to 20 such as methyl group, ethyl group, propyl group, i-propyl group, butyl group, i-butyl group, sec-butyl group, t-butyl group, pentyl group, hexyl group, heptyl group, and octyl group; and cycloalkyl groups having carbon atoms of 1 to 20 such as cyclopropyl group, cyclobutyl group, cyclopentyl group, cyclohexyl group, cycloheptyl group, and cyclooctyl group.

Preferred examples of the divalent hydrophobic unit include divalent fluorinated saturated hydrocarbon groups or divalent saturated hydrocarbon groups, and more preferred examples of the divalent hydrophobic unit include those having a following structure.

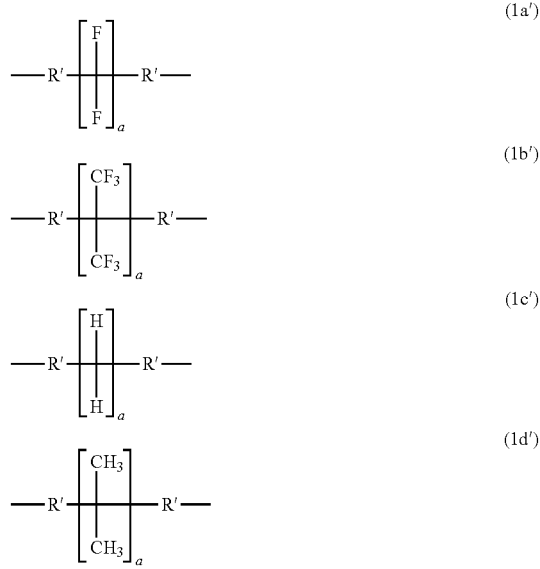

In the above formula (1a'), formula (1b'), formula (1c'), and formula (1d'), each R' has the same meaning as R' in the above formula (1').

In the above formula (1a'), formula (1b'), formula (1c'), and formula (1d'), each a represents an integer of 1 or more, preferably represents an integer of 1 to 10, and more preferably represents an integer of 2 to 6.

In the cation exchange resin of the present invention, the divalent hydrophilic unit is formed by repeating a divalent hydrophilic group via carbon-carbon bond. The divalent hydrophilic group is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, and at least one of the aromatic rings has a cation exchange group.

Examples of the aromatic ring include mono- or polyaromatic hydrocarbons having carbon atoms of 6 to 20 such as benzene ring, naphthalene ring, indene ring, azulene ring, fluorene ring, anthracene ring, and phenanthrene ring; and heterocyclic compounds such as azoles, oxole, thiophene, oxazole, thiazole, and pyridine.

Preferred examples of the aromatic ring include monoaromatic hydrocarbons having carbon atoms of 6 to 14, and more preferred examples of the aromatic ring include benzene ring.

If needed, the aromatic ring may be substituted with a substituent group such as a halogen atom, an alkyl group, or a pseudohalide. In the case where the aromatic ring is substituted with a substituent group such as a halogen atom, an alkyl group, or a pseudohalide, the number and the position of the substituent group such as a halogen atom, an alkyl group, or a pseudohalide is suitably selected depending on the purpose and application.

More specific examples of the aromatic ring substituted with a halogen atom include benzene rings substituted with 1 to 4 halogen atoms (for example, benzene rings substituted with 1 to 4 fluorine atoms, benzene rings substituted with 1 to 4 chlorine atoms, benzene rings substituted with 1 to 4 bromine atoms, and benzene rings substituted with 1 to 4 iodine atoms, in which 1 to 4 halogen atoms may be all the same or different).

Examples of the divalent hydrocarbon group include the divalent hydrocarbon groups as described above.

The number of the aromatic ring bonded to the divalent hydrocarbon group is 1 or 2, and is preferably 2.

When one more aromatic ring is bonded to the divalent hydrocarbon group, the hydrocarbon group becomes tervalent. When two more aromatic rings are connected to the divalent hydrocarbon group, the hydrocarbon group becomes tetravalent (if the carbon number of the group is 1, it is carbon atom).

When two aromatic rings are bonded to the divalent hydrocarbon group, the aromatic ring is bonded to each other, for example, via carbon-carbon bond.

The cation exchange group is introduced in the main chain or the side chain of the hydrophilic group. Specifically, the cation exchange group is not particularly limited, and any known cation exchange groups such as sulfonate group (—SO$_3$H), phosphate group (—PO$_3$H), and carboxylic acid (—COOH) can be used. From the viewpoint of the cation conductivity, preferred examples of the cation exchange group include sulfonate group.

In the case where the hydrophilic group has a plurality of aromatic rings, at least one of the aromatic rings is substituted with a substituent group having a cation exchange group. That is, a plurality of aromatic rings may be substituted with a substituent group having a cation exchange group, or all aromatic rings may be substituted with a substituent group having a cation exchange group. Also, in the case where two aromatic rings are bonded to the divalent hydrocarbon group, at least one of the aromatic rings is substituted with a substituent group having a cation exchange group. That is, for example, one of the aromatic rings in the side chain may be substituted with a substituent group having a cation exchange group, or both of the aromatic rings in the side chain may be substituted with a substituent group having a cation exchange group. One aromatic ring may be substituted with a plurality of substituent groups having a cation exchange group.

Preferred examples of the hydrophilic group include bisphenol residues which are substituted with a substituent group having a cation exchange group as described above, as shown in the following formula (2), and o-, m- or p-phenylene groups which are substituted with a substituent group having a cation exchange group as described above, as shown in the following formula (2').

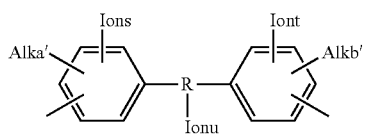

(2)

(In the formula, R represents a hydrocarbon group, a silicon-containing group, a nitrogen-containing group, a phospho-rus-containing group, an oxygen-containing group, a sulfur-containing group, an aromatic group, or direct bond, which is not substituted or which is substituted with a substituent group having a cation exchange group; each Alk is the same or different and represents an alkyl group; each Ion is the same or different and represents a substituent group having a cation exchange group; a' and b' are the same or different and represent an integer of 0 to 4; and s, t and u are the same or different and represent an integer of 0 to 4 and at least one of s, t and u is 1 or more.)

(2')

(In the formula, Alk represents an alkyl group; Ion represents a substituent group having a cation exchange group; a' represents an integer of 0 to 4; and s represents an integer of 1 to 4.)

In the above formula (2), R represents a hydrocarbon group, a silicon-containing group, a nitrogen-containing group, a phosphorus-containing group, an oxygen-containing group, a sulfur-containing group, or direct bond, and preferably represents isopropylene (—C(CH$_3$)$_2$—). R may be substituted with a substituent group having a cation exchange group.

In the above formula (2), each Alk is the same or different and represents an alkyl group. Examples of the alkyl group include alkyl groups having carbon atoms of 1 to 20 such as methyl group, ethyl group, propyl group, i-propyl group, butyl group, i-butyl group, sec-butyl group, t-butyl group, pentyl group, hexyl group, heptyl group, and octyl group; cycloalkyl groups having carbon atoms of 1 to 20 such as cyclopropyl group, cyclobutyl group, cyclopentyl group, cyclohexyl group, cycloheptyl group, and cyclooctyl group.

In the above formula (2), each Ion is the same or different and represents a substituent group having a cation exchange group as described above, and preferably represents sulfonate group as described above.

In the above formula (2), a' and b' are independently the same or different and represent an integer of 0 to 4, and preferably represent an integer of 0 to 2. Further preferably, both a and b represent 0.

In the above formula (2), s, t and u are independently the same or different and represent an integer of 0 to 4, and at least one of s, t and u is 1 or more.

In the above formula (2), when s, t and/or u is in a range of 1 to 3, the position of the substituent group having a cation exchange group is suitably selected depending on the purpose and application.

In the above formula (2'), Alk is the same or different and represents the alkyl group as described above.

In the above formula (2'), Ion represents a substituent group having the cation exchange group as described above, and preferably represents the sulfonate group as described above.

In the above formula (2'), a' represents an integer of 0 to 4, preferably represents an integer of 0 to 2, and further preferably represents 0.

In the above formula (2'), s represents an integer of 1 to 4. The position of the substituent group having a cation exchange group is suitably selected depending on the purpose and application.

Other examples of the hydrophilic group include those having the following structure.

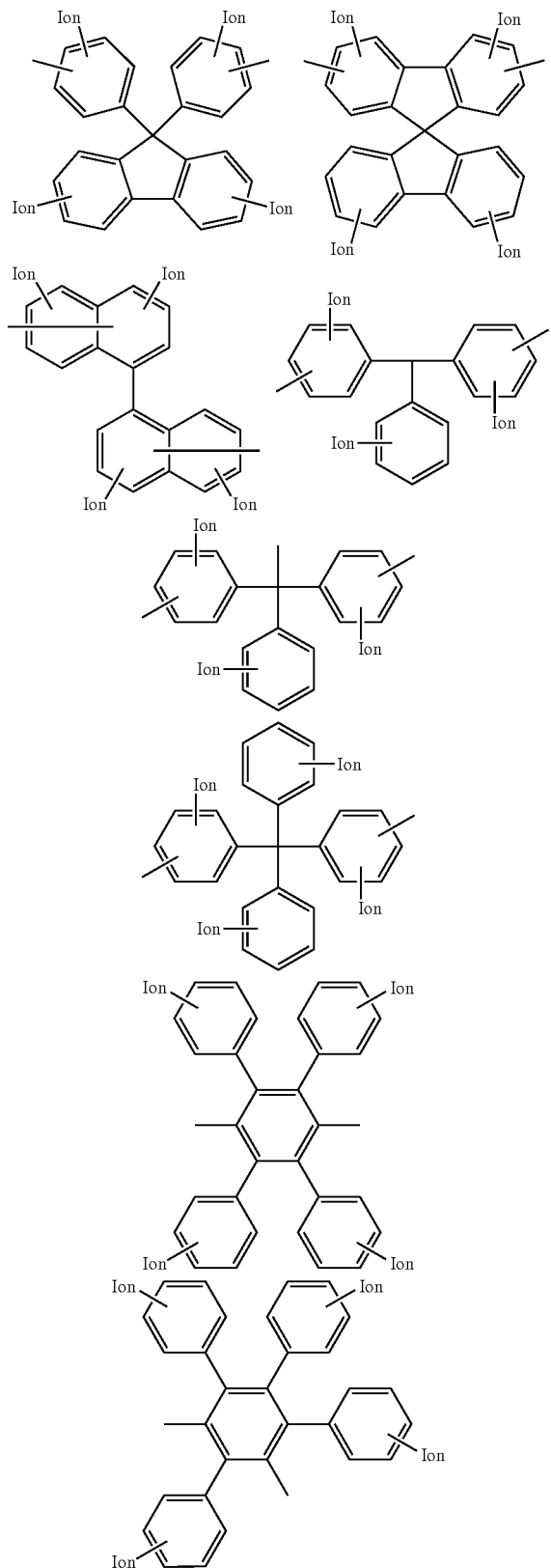

(In the formulae, each Ion represents a substituent group having a cation exchange group or hydrogen atom, at least one of them is a substituent group having a cation exchange group. A plurality of Ion may be bonded in one benzene ring structure.)

Particularly preferred examples of the hydrophilic group include p-phenylene groups shown in the following formula (3'), and m-phenylene groups shown in the following formula (3").

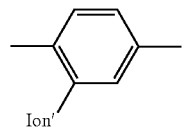

(3')

(In the formula, Ion' represents a substituent group having a cation exchange group.)

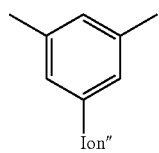

(3")

(In the formula, Ion" represents a substituent group having a cation exchange group.)

In the cation exchange resin of the present invention, the divalent hydrophilic unit is formed by repeating a divalent hydrophilic group via carbon-carbon bond. Preferably, the divalent hydrophilic unit is formed by repeating the divalent hydrophilic group via carbon-carbon bond. The unit corresponds to a block in a conventionally used block copolymer.

Preferred examples of the hydrophilic unit include units formed by bonding bisphenol A residues substituted with a substituent group having a cation exchange group as shown in the above formula (2) (hydrophilic group) and/or o-, m- or p-phenylene groups substituted with a substituent group having a cation exchange group as shown in the above formula (2') (hydrophilic group) to each other via carbon-carbon bond. It may be a unit formed by bonding two or more types of hydrophilic groups to each other via carbon-carbon bond.

For example, the hydrophilic unit is shown in the following formula (4) or the following formula (4').

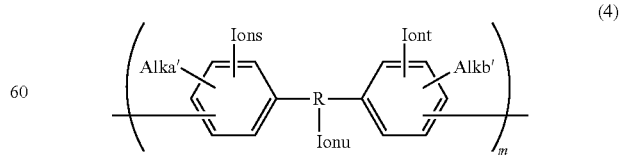

(4)

(In the formula, R, Alk, Ion, a', b', s, t and u have the same meaning as R, Alk, Ion, a', b', s, t and u in the above formula (2); and m represents an integer of 1 to 200.)

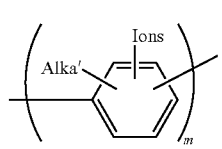
(4')

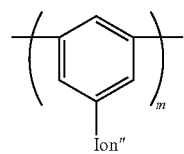
(5")

(In the formula, Alk, Ion, a' and s have the same meaning as Alk, Ion, a' and s in the above formula (2'); and m represents an integer of 1 to 200.)

Particularly preferred examples of the hydrophilic unit include units formed by bonding p-phenylenes shown in the above formula (3') to each other via carbon-carbon bond; units formed by bonding m-phenylenes shown in the above formula (3") to each other via carbon-carbon bond; and units formed by bonding p-phenylenes shown in the above formula (3') and m-phenylenes shown in the above formula (3") to each other via carbon-carbon bond.

For example, the hydrophilic unit is shown in the following formula (5'), the following formula (5"), or the following formula (5''').

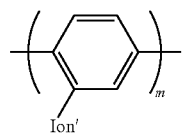
(5')

(In the formula, Ion' has the same meaning as Ion' in the above formula (3'); and m has the same meaning as m in the above formula (4').)

(In the formula, Ion" has the same meaning as Ion" in the above formula (3"); and m has the same meaning as m in the above formula (4').)

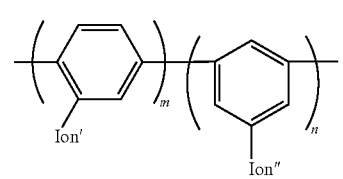
(5''')

(In the formula, Ion' and Ion" have the same meaning as Ion' in the above formula (3') and Ion" in the above formula (3"); and m and n have the same meaning as m in the above formula (4').)

In the cation exchange resin of the present invention, the hydrophobic unit as described above and the hydrophilic unit as described above are bonded to each other via carbon-carbon bond. In particular, the hydrophobic unit as described above and the hydrophilic unit as described above are bonded to each other via carbon-carbon bond.

Preferred examples of the cation exchange resin include cation exchange resins formed by bonding the hydrophobic units shown in the above formula (1') and the hydrophilic units shown in the above formula (4) to each other via carbon-carbon bond, as shown in the following formula (6); and cation exchange resins formed by bonding the hydrophobic units shown in the above formula (1') and the hydrophilic units shown in the above formula (4') to each other via carbon-carbon bond, as shown in the following formula (6').

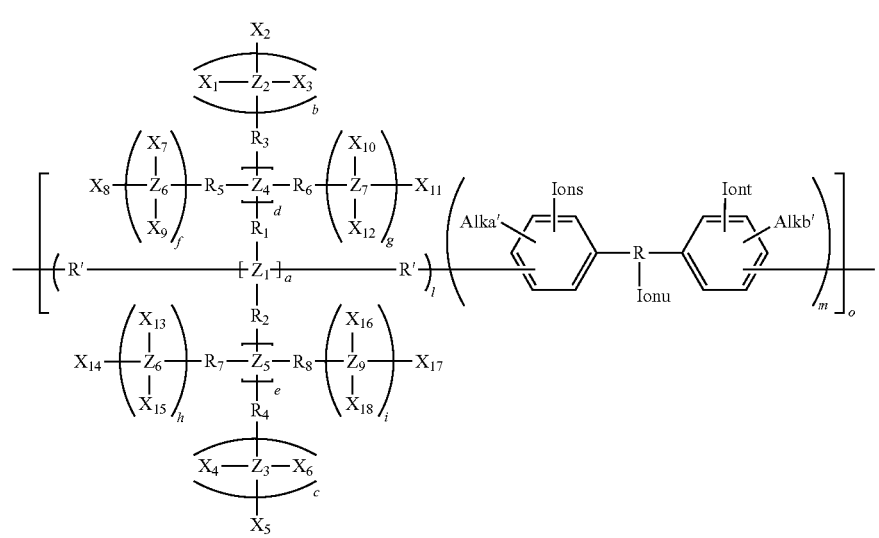
(6)

(In the formula, $Z_1$ to $Z_9$, $R_1$ to $R_8$, R', $X_1$ to $X_{18}$, a, b, c, d, e, f, g, h and i have the same meaning as $Z_1$ to $Z_9$, $R_1$ to $R_8$, R', $X_1$ to $X_{18}$, a, b, c, d, e, f, g, h and i in the above formula (1'); R, Alk, Ion, a', b', s, t and u have the same meaning as R, Alk, Ion, a', b', s, t and u in the above formula (2); l and m represents the blending ratio; and o represents an integer of 1 to 100.)

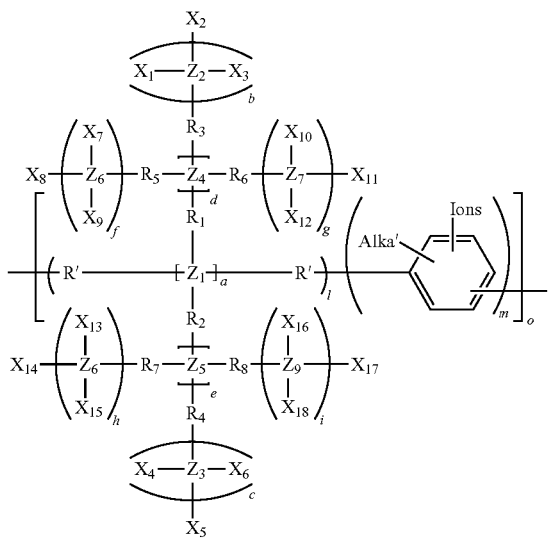

(6')

(In the formula, $Z_1$ to $Z_9$, $R_1$ to $R_8$, R', $X_1$ to $X_{18}$, a, b, c, d, e, f, g, h and i have the same meaning as $Z_1$ to $Z_9$, $R_1$ to $R_8$, R', $X_1$ to $X_{18}$, a, b, c, d, e, f, g, h and i in the above formula (1'); Alk, Ion, a' and s have the same meaning as Alk, Ion, a' and s in the above formula (2); l and m represents the blending ratio; and o represents an integer of 1 to 100.)

The number average molecular weight of the cation exchange resin is adjusted to 10 to 1000 kDa, and preferably adjusted to 30 to 500 kDa.

Further preferred examples of the cation exchange resin include cation exchange resins formed by bonding the hydrophobic units shown in the above formula (1a') and the hydrophilic units shown in the above formula (5''') to each other via carbon-carbon bond, as shown in the following formula (7); and cation exchange resins formed by connecting the hydrophobic units shown in the above formula (1c') and the hydrophilic units shown in the above formula (5''') to each other via carbon-carbon bond, as shown in the following formula (7'). Particularly preferred examples of the cation exchange resin include cation exchange resins shown in the following formula (7'') or the following formula (7''').

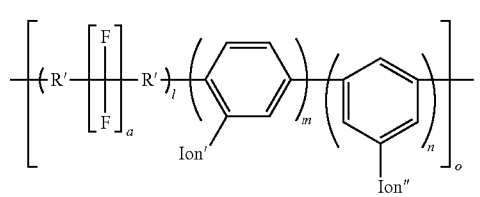

(7)

(In the formula, R' and a have the same meaning as R' and a in the above formula (1'); Ion' and Ion" have the same meaning as Ion' in the above formula (3') and Ion" in the above formula (3''); l, m and n represents the blending ratio; and o represents an integer of 1 to 100.)

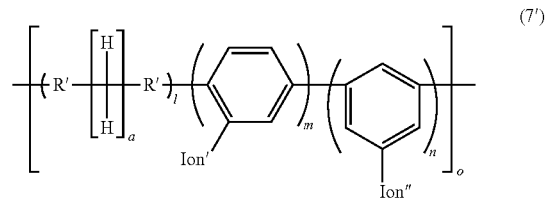

(7')

(In the formula, R' and a have the same meaning as R' and a in the above formula (1'); Ion' and Ion" have the same meaning as Ion' in the above formula (3') and Ion" in the above formula (3''); l, m and n represents the blending ratio; and o represents an integer of 1 to 100.)

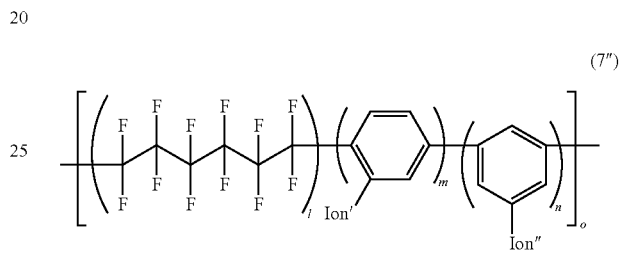

(7'')

(In the formula, Ion' and Ion" have the same meaning as Ion' in the above formula (3') and Ion" in the above formula (3''); l, m and n represents the blending ratio; and o represents an integer of 1 to 100.)

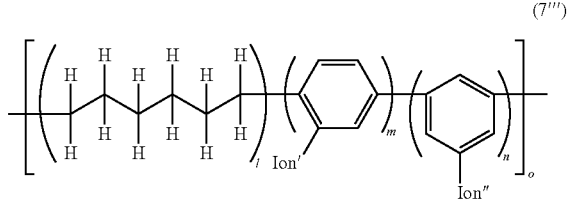

(7''')

(In the formula, Ion' and Ion" have the same meaning as Ion' in the above formula (3') and Ion" in the above formula (3''); l, m and n represents the blending ratio; and o represents an integer of 1 to 100.)

As described above, the number average molecular weight of the cation exchange resin is, for example, 10 to 1000 kDa, and is preferably 30 to 500 kDa.

The method for producing the cation exchange resin is not particularly limited, and any method known in the art can be used. Preferably, the method by polycondensation reaction is used.

In the case where the cation exchange resin is produced by this method, for example, a monomer for forming a divalent hydrophobic unit (hereinafter referred to as "first monomer") and a monomer for forming a hydrophilic unit (hereinafter referred to as "second monomer") are first polymerized by polycondensation reaction, and a substituent group having a cation exchange group is then introduced to the resulting precursor polymer for the cation exchange resin.

As the polycondensation reaction, any conventional known methods can be used. Preferably, cross-coupling reaction between two dihalide for forming a carbon-carbon direct bond is used.

Examples of the first monomer for forming the divalent hydrophobic unit include compounds shown in the following formula (11).

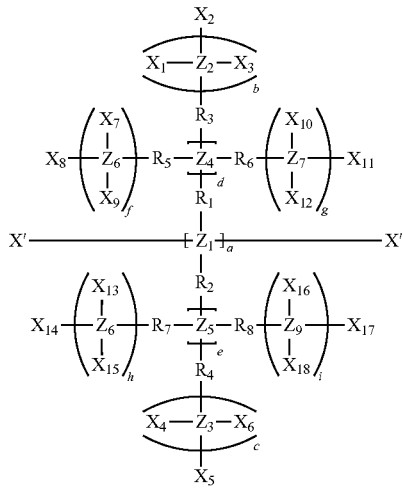

(11)

(In the formula, $Z_1$ to $Z_9$, $R_1$ to $R_8$, $X_1$ to $X_{18}$, b, c, d, e, f, g, h and i have the same meaning as $Z_1$ to $Z_9$, $R_1$ to $R_8$, $X_1$ to $X_{18}$, b, c, d, e, f, g, h and i in the above formula (1'); and each X' is the same or different and represents a halogen atom or a pseudohalide.)

The first monomer for forming the divalent hydrophobic unit may be bonded to a divalent hydrocarbon group via carbon-carbon bond or via carbon-silicon bond, as shown in the following formula (11'). In this case, the first monomer is regarded as containing the divalent hydrocarbon group.

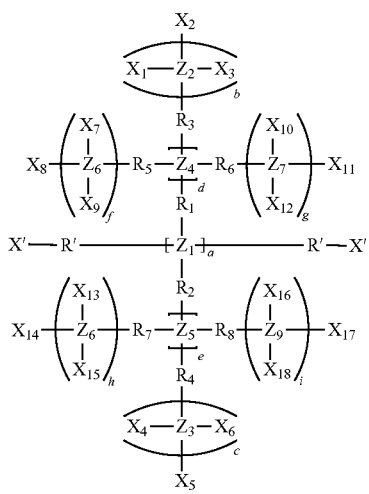

(11')

(In the formula, $Z_1$ to $Z_9$, $R_1$ to $R_8$, R', $X_1$ to $X_{18}$, a, b, c, d, e, f, g, h and i have the same meaning as $Z_1$ to $Z_9$, $R_1$ to $R_8$, R', $X_1$ to $X_{18}$, a, b, c, d, e, f, g, h and i in the above formula (1'); and X' has the same meaning as X' in the above formula (11).)

Preferred examples of the first monomer include compounds shown in the following formula (11a'), which correspond to the above formula (1a'); compounds shown in the following formula (11b'), which correspond to the above formula (1b'); compounds represented by the following formula (11c'), which correspond to the above formula (1c'); and compounds represented by the following formula (11d'), which correspond to the above formula (1d').

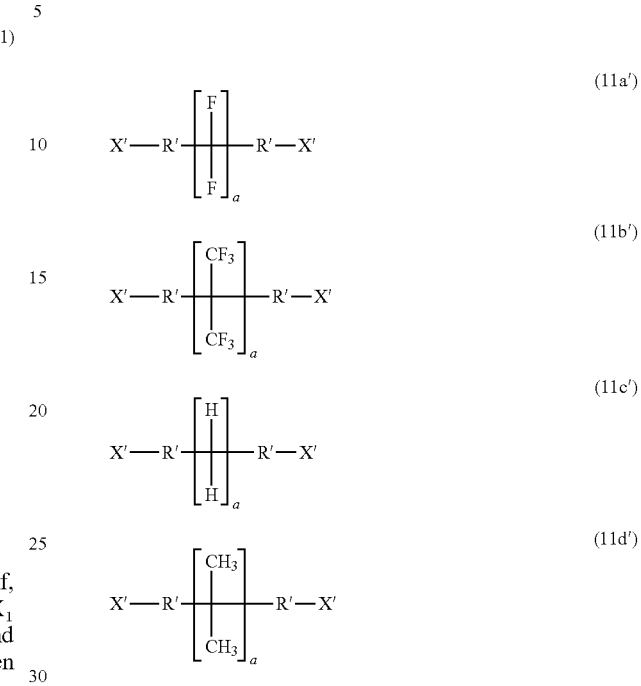

In the above formula (11a'), formula (11b'), formula (11c'), and formula (11d'), R' and a have the same meaning as R' and a in the above formula (1a'), formula (1b'), formula (1c'), and formula (1d'); and X' has the same meaning as X' in the above formula (11').

Particularly preferred examples of the first monomer include compounds represented by the following formula (11a") and the following formula (11c").

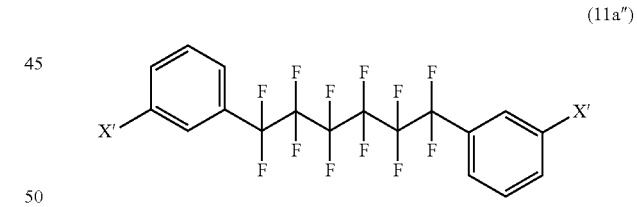

(In the formula, X' has the same meaning as X' in the above formula (11a').)

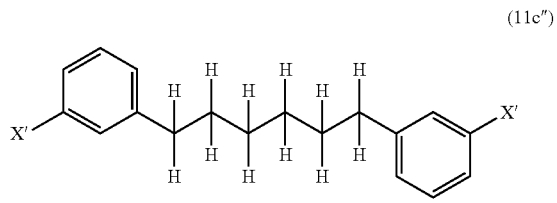

(In the formula, X' has the same meaning as X' in the above formula (11c').)

The examples of the second monomer for forming the hydrophilic unit include dihalogenated compounds being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond.

Preferred examples of the dihalogenated compound for forming the hydrophilic unit include compounds shown in the following formula (12), which correspond to the above formula (2), and compound shown in the following formula (12'), which correspond to the above formula (3').

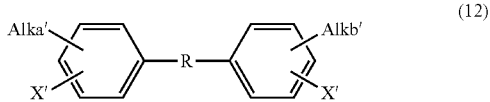

(12)

(In the formula, each X' is the same or different and represents a halogen atom or a pseudohalide.)

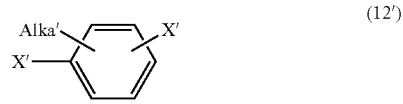

(12')

(In the formula, each X' is the same or different and represents a halogen atom or a pseudohalide.)

Particularly preferred examples of the dihalogenated compound for forming the hydrophilic unit include compounds shown in the following formula (13').

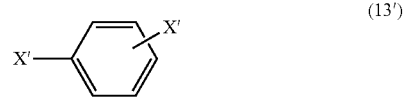

(13')

(In the formula, X' has the same meaning as X' in the above formula (12').)

In the case of the polymerization by cross-coupling reaction between the first monomer and the second monomer, the blending ratio of the first monomer and the second monomer is adjusted so that the blending ratio of the hydrophobic unit and the hydrophilic unit in the resulting precursor polymer for the cation exchange resin is within the desired range.

In this method, any conventional known method can be used, such as a polymerization method by dissolving the first monomer and the second monomer in a solvent such as N,N-dimethylamide or dimethyl sulfoxide, and by using bis(cycloocta-1,5-diene) nickel(0) as a catalyst.

The reaction temperature in the cross-coupling reaction is, for example, −100 to 300° C., and is preferably −50 to 200° C. The reaction time is, for example, from 1 to 48 hours, and is preferably 2 to 5 hours.

By the method, the precursor polymer for the cation exchange resin, preferably a precursor polymer for the cation exchange resin shown in the following formula (16) or a precursor polymer for the cation exchange resin shown in the following formula (16') is obtained.

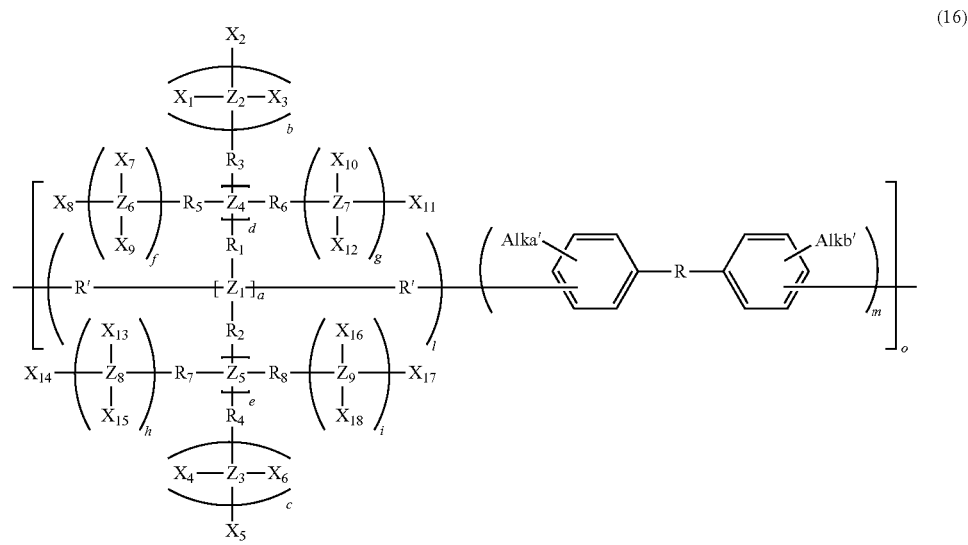

(16)

(In the formula, $Z_1$ to $Z_9$, $R_1$ to $R_8$, R', $X_1$ to $X_{18}$, a, b, c, d, e, f, g, h, i, R, Alk, a', b', l, m and o have the same meaning as $Z_1$ to $Z_9$, $R_1$ to $R_8$, R', $X_1$ to $X_{18}$, a, b, c, d, e, f, g, h, i, R, Alk, a', b', l, m and o in the above formula (6).)

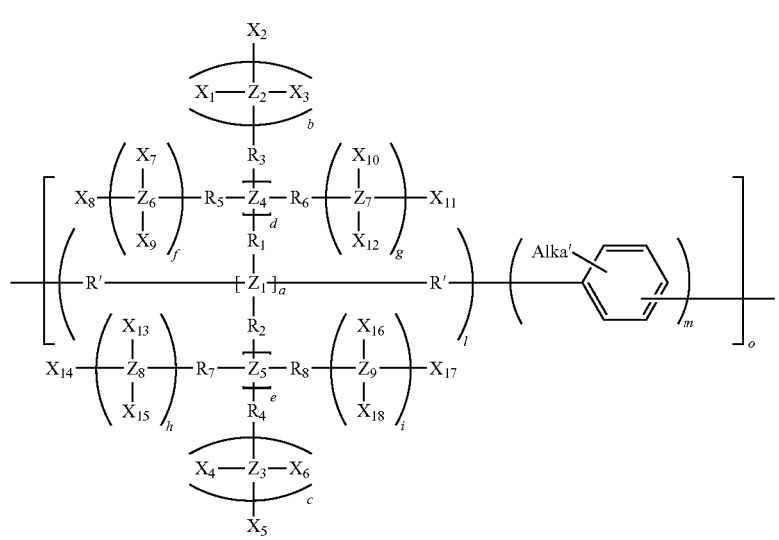
(16')

(In the formula, $Z_1$ to $Z_9$, $R_1$ to $R_8$, R', $X_1$ to $X_{18}$, a, b, c, d, e, g, h, i, Alk, a', l, m and o have the same meaning as $Z_1$ to $Z_9$, $R_1$ to $R_8$, R', $X_1$ to $X_{18}$, a, b, c, d, e, f, g, h, i, Alk, a', l, m and o in the above formula (6').)

Further preferred examples of the precursor polymer for the cation exchange resin include precursor polymers for the cation exchange resin shown in the following formula (17) or the following formula (17'). Particularly preferred examples of the precursor polymers for the cation exchange resin include precursor polymers for the cation exchange resin shown in the following formula (17") or the following formula (17''').

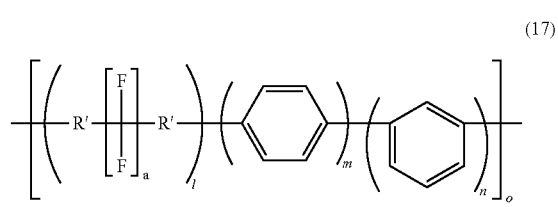
(17)

(In the formula, R', a, R", l, m and n have the same meaning as R', a, R", l, m and n in the above formula (7).)

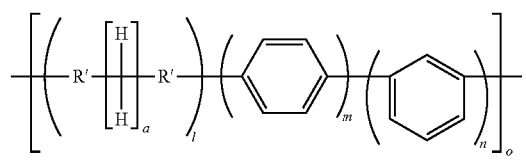
(17')

(In the formula, R', a, R", l, m and n have the same meaning as R', a, R", l, m and n in the above formula (7').)

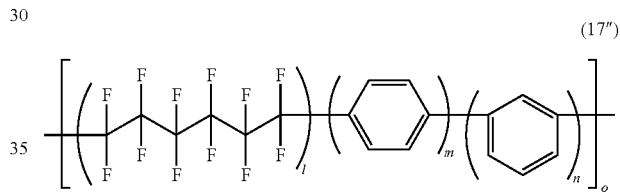
(17")

(In the formula, l, m and n have the same meaning as l, m and n in the above formula (7").)

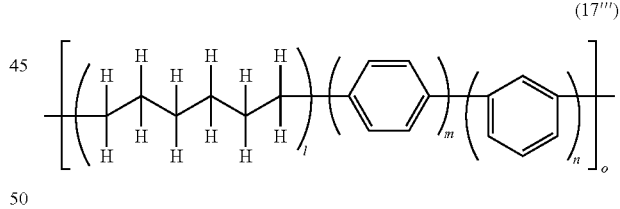
(17''')

(In the formula, l, m and n have the same meaning as l, m and n in the above formula (7''').)

In the method, a substituent group having a cation exchange group is then introduced to the precursor polymer for the cation exchange resin.

The method for introducing the substituent group having the cation exchange group is not particularly limited, and any method known in the art can be used.

For example, the substituent group having the cation exchange group is introduced by aromatic electrophilic substitution reaction.

By the method, a cation exchange resin, preferably a cation exchange resin shown in the above formula (6) or a cation exchange resin shown in the above formula (6'), and particularly preferably a cation exchange resin shown in the above formula (7) or a cation exchange resin shown in the above formula (7') is obtained by introducing a substituent group having a cation exchange group to the precursor polymer for the cation exchange resin.

The cation exchange capacity of the cation exchange resin is, for example, 0.1 to 5.0 meq./g, and is preferably 0.5 to 4.0 meq./g.

The cation exchange capacity can be calculated by the following equation (20):

[cation exchange capacity (meq./g)]=the amount of the cation exchange group introduced per a hydrophilic unit×the repeating number of the hydrophilic unit×1000 /(the molecular weight of the hydrophobic unit×the repeating number of the hydrophobic unit+the molecular weight of the hydrophilic unit×the repeating number of the hydrophilic unit+the molecular weight of the cation exchange group×the amount of the cation exchange group introduced per a hydrophilic unit×the repeating number of the hydrophilic unit)   (20)

In the equation, the amount of the cation exchange group introduced is defined as the number of the cation exchange group per a hydrophilic group. The amount of the cation exchange group introduced is a mole number (mol) of the cation exchange group introduced in the main chain or the side chain of the hydrophilic unit.

The cation exchange resin comprises a divalent hydrophobic unit shown in the above formula (1); and a divalent hydrophilic unit having divalent hydrophilic groups which are repeated via carbon-carbon bond, the divalent hydrophilic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, at least one of the aromatic rings having a cation exchange group; wherein the hydrophobic unit and the hydrophilic unit are bonded to each other via carbon-carbon bond. That is, the cation exchange resin has improved chemical properties (durability, solubility, and resistance effect to gas penetration) and mechanical properties (flexibility) because the cation exchange resin comprises a hydrophobic unit having improved chemical and mechanical properties and a hydrophilic unit obtained by introducing a cation exchange group to the structure having an aromatic ring having improved resistance effect to gas penetration.

In particular, because of its high flexibility, the cation exchange resin can be used to improve the handling properties in forming into a membrane-electrode assembly (MEA). Since the cation exchange resin shows high solubility to organic solvents (for example, the resin is dissolved in an organic solvent having a low boiling point, such as methanol or ethanol), when the resin is used as a binder for forming an electrode catalyst layer, a solvent having a high boiling point such as dimethyl sulfoxide which may degrade a material such an electrode catalyst is not required, and the resin is expected to improve the durability.

In particular, the cation exchange resin has improved durability such as radical resistance because the resin comprises the hydrophilic unit having the hydrophilic group which is repeated via carbon-carbon bond (i.e., the resin has no ether bond). More specifically, if the hydrophilic unit has an ether bond, for example, the degradation by a hydroxyl radical (.OH) may be occurred, as shown below, and the cation exchange resin may have insufficient radical resistance.

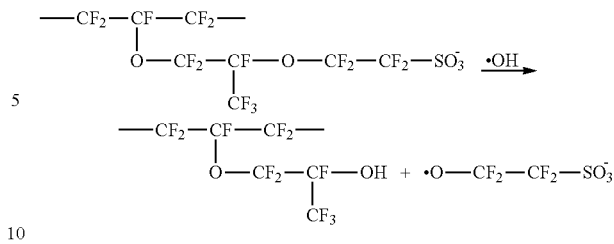

In contrast, the degradation by the mechanism as described above does not occur because the hydrophilic unit in which the hydrophilic group is repeated via carbon-carbon bond in the cation exchange resin has no ether bond. As a result, the cation exchange resin has improved durability such as radical resistance.

A cation exchange membrane obtained by the cation exchange resin is encompassed within the present invention. More specifically, a cation exchange membrane which contains the cation exchange resin to which the cation exchange group is introduced is encompassed within the present invention. An electrolyte membrane for a fuel cell which contains the cation exchange resin is also encompassed within the present invention.

The cation exchange membrane may be reinforced with a reinforcing material known in the art, for example, a porous substrate. Further, the cation exchange membrane may be processed by various procedures including biaxially orientation procedure for controlling the molecular orientation, heat procedure for controlling the crystallinity and the residual stress. Fillers known in the art can be added to the cation exchange membrane in order to improve the mechanical strength of the cation exchange membrane. The cation exchange membrane and a reinforcing material such as glass unwoven fabric may be pressed to form the complex.

In the cation exchange membrane, a commonly used various additive, for example, a compatibilizing agent for improving the compatibility, an antioxidant for preventing the degradation of the resin, and an antistatic agent or a lubricant for improving the handling in forming into the film can be suitably contained in the cation exchange membrane, as long as the additive do not have an effect on the processability and properties of the cation exchange membrane.

The thickness of the cation exchange membrane is not particularly limited, and is suitably selected depending on the purpose and application. For example, the thickness of the cation exchange membrane is 1 to 350 μm, and is preferably 5 to 200 μm.

Although exemplary embodiments of the present invention have been described hereinabove, the embodiments of the present invention are not limited to these embodiments, but may be suitably modified by those skilled in the art without departing from the scope of the invention.

Exemplary applications of the fuel battery of the present invention include power supplies of drive motors for automobiles, marine vessels, or aircrafts; and power supplies for communication terminals including mobile phones.

EXAMPLES

Although the present invention is described based on Example and Comparative Example, the present invention is not limited to the following examples.

Example (Synthesis of SPAF)

<Synthesis of Fluoroalkyl Monomer>

To a 100 mL of three necked round-shaped flask equipped with a nitrogen inlet/outlet and a cooling tube were added dodecafluoro-1,6-diiodohexane (9.87 g, 17.8 mmol), 3-chloroiodobenzene (12.7 g, 53.4 mmol), and dimethyl sulfoxide (72 mL). After stirring the mixture to form a homogenous solution, copper powder (11.3 g, 178 mmol) was added to the solution, and then heated to 120° C. and reacted for 48 hours.

The reaction was quenched by adding the reaction mixture dropwise to 0.1 M aqueous nitric acid, and the precipitated red-brown solid was filtered and collected. The resulting red-brown solid was washed with methanol, and the filtrate was collected. Additionally, it was washed with methanol, the filtrate was collected, and these filtrates were mixed.

When the amount of pure water equivalent to the amount of methanol was added to the collected filtrate, white solid was precipitated. The solid was filtered and collected, and washed with a mixed solution of water and methanol at the ratio of 1:1 for several times. The solid was dried under vacuum at 60° C. overnight.

By this method, the white-colored fluoroalkyl monomer having the following formula was obtained in 80% yield.

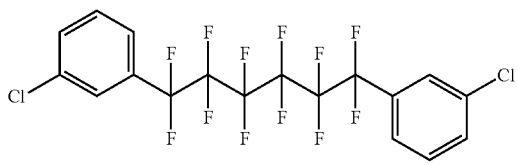 [SMILES: FC(F)(c1cccc(Cl)c1)C(F)(F)C(F)(F)C(F)(F)C(F)(F)C(F)(F)c1cccc(Cl)c1]

<Synthesis of Precursor Polymer for Cation Exchange Resin>

To a 100 mL of three necked round-shaped flask equipped with a nitrogen inlet/outlet and a cooling tube were added the fluoroalkyl monomer (3.61 g, 6.92 mmol), 1,4-dichlorobenzene (0.631 g, 4.29 mmol), 1,3-dichlorobenzene (0.489 g, 3.32 mmol), 2,2'-bipyridine (5.68 g, 36.4 mmol), and N,N-dimethyl acetamide (37 mL). After stirring the mixture to form a homogeneous solution, bis(1,5-cyclooctadiene) nickel(0) (10.0 g, 36.4 mmol) was added to the solution, and then heated to 80° C. and reacted for 3 hours.

The reaction was quenched by adding the reaction mixture dropwise to methanol, and the precipitated white solid was filtered and collected. The resulting black solid was washed with concentrated HCl, pure water and methanol for several times, and the solid was dried under vacuum at 60° C. overnight.

By this method, the white-colored precursor polymer for the cation exchange resin PAF having the following formula (l=1.0, m=0.48, n=2.62) was obtained in 91% yield.

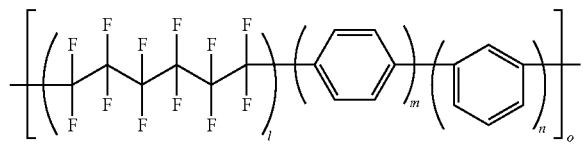

<Introduction of Cation Exchange Group>

To a 50 mL of round-shaped flask were added the precursor polymer for the cation exchange resin (0.50 g) and 30% sulfuric acid, fuming (9 mL), and reacted at room temperature for 3 days.

The reaction was quenched by adding the reaction mixture dropwise to ice and water, and the precipitated brown solid was filtered and collected. The resulting brown solid was washed with pure water for several times, and the solid was dried under vacuum at 80° C. overnight.

By this method, the brown cation exchange resin SPAF was obtained.

<Forming Membrane>

The membrane was formed using the cation exchange resin SPAF by solution casting method.

That is, the cation exchange resin SPAF (0.37 g) was dissolved in dimethyl sulfoxide (9 mL), and then the insoluble material is removed by filtration. The filtrate was poured on a glass plate wound with silicone rubber having a size of 9 cm×9 cm, and kept it overnight and dried on a hot plate adjusted so as to be oriented horizontally at 50° C. to obtain a transparent membrane having a thickness of about 30 am.

(Evaluation of Cell of the SPAF Membrane)

To a zirconia pot were added a carbon-supported platinum catalyst, pure water and ethanol, and agitated with a ball mill. After that, a Nafion® solution was added, and the resulting solution was agitated with a planetary ball mill to prepare a catalyst paste. The prepared paste was transferred to a PFA pot, and was kept overnight on a table top-type pot mill rotator. A catalyst ink stabilized overnight was applied on both surface of the SPAF membrane (cation exchange capacity: 1.6 mequiv/g) by pulse swirl spray method. The amount of platinum supported was 0.50±0.03 mg/cm$^2$ at both electrode. After the membrane was dried in a thermostatic chamber at 60° C., the membrane was hot pressed at 140° C. for 3 minutes for annealing treatment to form a catalyst coated membrane (CCM). The CCM and a gas diffusion layer (GDL) were incorporated in a cell, and the properties of the cell was evaluated.

FIG. 1 shows the result of Linear Sweep Voltammetry using the SPAF membrane or Nafion® NRE211 membrane as the cell. The measurement was performed under conditions: cell temperature was 80° C.; gas humidification degree is 100% RH, 80% RH, 53% RH or 30% RH, potential sweep range is 0.15 to 0.60 V, potential sweep speed is 0.5 mV/s, while controlling potential. During the measurement, hydrogen gas was supplied at 100 ml/min at the side of anode, and nitrogen gas was supplied at 100 ml/min at the side of cathode. The detected current value shows an oxidation current of hydrogen gas in the cathode which has been penetrated from the anode to the cathode in the electrolyte membrane, which is an index of the amount of hydrogen penetrated in the membrane.

According to the linear sweep voltammogram as shown in FIG. 1, the amount of hydrogen penetrated in the SPAF cell was about 25% of Nafion® NRE211 cell having the similar perfluoro main chain, and the SPAF was found to show higher gas barrier properties.

Figure 2:
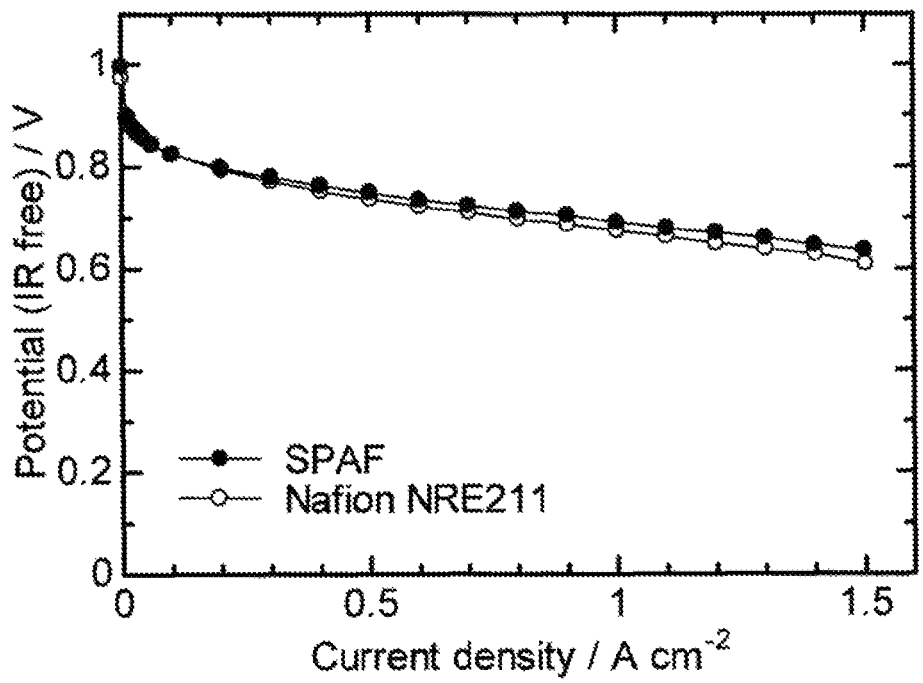
FIG. 2 is a graph showing the current density-voltage properties using SPAF membrane or Nafion® NRE211 membrane as a cell.

FIG. 2 shows the current density-voltage properties using the SPAF membrane or Nafion® NRE211 membrane as the cell. The power generation properties were evaluated under conditions of cell temperature 80° C. and 100% RH. Hydrogen gas was used as an anode gas (the utilization rate is 70%), and air was used as a cathode gas (the utilization rate is 40%). The resistance of the cell was measured by a resistance measuring device at a constant frequency of 1 kHz.

According to the current density-voltage properties as shown in FIG. 2, the SPAF cell showed the properties higher than Nafion® NRE211 cell at the conditions.

What is claimed is:
1. A cation exchange resin, comprising:
a divalent hydrophobic unit shown in any one of the following formulae (1a'), (1b'), (1c') and (1d'); and
a divalent hydrophilic unit having divalent hydrophilic groups which are repeated via carbon-carbon bond, the divalent hydrophilic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, at least one of the aromatic rings having a cation exchange group;
wherein the hydrophobic unit and the hydrophilic unit are bonded to each other via carbon-carbon bond;

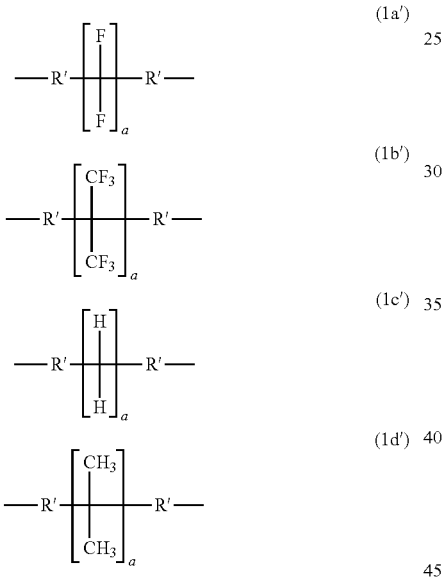

wherein R' is the same or different and represents a divalent aliphatic hydrocarbon groups having carbon atoms of 1 to 20 or direct bond, a is an integer of 1 to 10.

2. The cation exchange resin according to claim 1, wherein the hydrophilic group is a bisphenol residue which is substituted with a substituent group having a cation exchange group, as shown in the following formula (2), or an o-, m- or p-phenylene group which is substituted with a substituent group having a cation exchange group, as shown in the following formula (2')

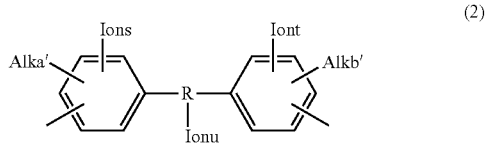

(In the formula, R represents a hydrocarbon group, a silicon-containing group, a nitrogen-containing group, a phosphorus-containing group, an oxygen-containing group, a sulfur-containing group, an aromatic group, or direct bond, which is not substituted or which is substituted with a substituent group having a cation exchange group; each Alk is the same or different and represents an alkyl group; each Ion is the same or different and represents a substituent group having a cation exchange group; a' and b' are the same or different and represent an integer of 0 to 4; and s, t and u are the same or different and represent an integer of 0 to 4 and at least one of s, t and u is 1 or more)

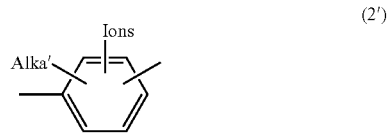

(In the formula, Alk represents an alkyl group; Ion represents a substituent group having a cation exchange group; a' represents an integer of 0 to 4; and s represents an integer of 1 to 4).

3. The cation exchange resin according to claim 1, wherein the hydrophobic unit is a divalent fluorinated saturated hydrocarbon group or a divalent saturated hydrocarbon group.

4. A cation exchange membrane, comprising the cation exchange resin according to claim 3.

5. An electrolyte membrane for a fuel cell, comprising the cation exchange resin according to claim 3.

6. The cation exchange resin according to claim 2, wherein the hydrophobic unit is a divalent fluorinated saturated hydrocarbon group or a divalent saturated hydrocarbon group.

7. A cation exchange membrane, comprising the cation exchange resin according to claim 6.

8. An electrolyte membrane for a fuel cell, comprising the cation exchange resin according to claim 6.

* * * * *